(12) United States Patent
Keselman

(10) Patent No.: US 8,792,710 B2
(45) Date of Patent: Jul. 29, 2014

(54) STEREOSCOPIC DEPTH RECONSTRUCTION WITH PROBABILISTIC PIXEL CORRESPONDENCE SEARCH

(75) Inventor: Leonid M. Keselman, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 169 days.

(21) Appl. No.: 13/556,508

(22) Filed: Jul. 24, 2012

(65) Prior Publication Data

US 2014/0029836 A1  Jan. 30, 2014

(51) Int. Cl.
*G06K 9/00* (2006.01)

(52) U.S. Cl.
USPC .......................................................... 382/154

(58) Field of Classification Search
CPC ............................................. H04N 2013/0074
See application file for complete search history.

(56) References Cited

U.S. PATENT DOCUMENTS

| | | | | |
|---|---|---|---|---|
| 7,711,180 | B2 * | 5/2010 | Ito et al. .......................... | 382/154 |
| 8,009,897 | B2 * | 8/2011 | Xu et al. ......................... | 382/154 |
| 8,406,512 | B2 * | 3/2013 | Lin et al. ........................ | 382/154 |
| 2011/0080466 | A1 * | 4/2011 | Kask et al. ...................... | 348/43 |
| 2011/0091096 | A1 * | 4/2011 | Morris et al. ................... | 382/154 |
| 2012/0113219 | A1 * | 5/2012 | Chang et al. .................... | 348/43 |

\* cited by examiner

*Primary Examiner* — Daniel Mariam
(74) *Attorney, Agent, or Firm* — Grossman, Tucker, Perreault & Pfleger, PLLC

(57) ABSTRACT

Generally, this disclosure provides devices, systems and methods for stereoscopic depth reconstruction, for 3-D imaging, with improved probabilistic pixel correspondence searching. The method may include obtaining a first image and a second image; down-sampling the first image; down-sampling the second image; generating a reduced resolution disparity matrix for the first down-sampled image including estimated correspondence pixels from the second down-sampled image; generating a reduced resolution quality matrix including quality metric values associated with pixels in the reduced resolution disparity matrix; up-sampling the reduced resolution disparity matrix to a first full resolution disparity matrix; up-sampling the reduced resolution quality matrix to a full resolution quality matrix; and generating a second full resolution disparity matrix for the first image including estimated correspondence pixels from the second image, the estimated correspondence pixels selected from a search range in the second image.

28 Claims, 6 Drawing Sheets

STEREOSCOPIC DEPTH RECONSTRUCTION WITH PROBABILISTIC PIXEL CORRESPONDENCE SEARCH

FIELD

The present disclosure relates to stereoscopic depth reconstruction, and more particularly, to stereoscopic imaging based on stereoscopic depth reconstruction with improved probabilistic pixel correspondence search.

BACKGROUND

Estimating depth information in an image enables construction of three dimensional (3-D) images and measurements and provides improved perceptual capabilities. This can be useful, for example, to enhance the capabilities of computer or robotic systems with 3-D vision. Depth information may be obtained from a pair of stereoscopic images, a left image and a right image, by determining the pixel offset (or disparity) of corresponding features in each image. The disparity can be geometrically related to depth in the image.

Pixels from the left image are typically compared to pixels from the right image, based on a cost metric that measures the difference between the two, with a minimum cost pixel selected for the estimated disparity. The cost metrics are often computationally intensive and the number of pixels that may need to be searched can be relatively large, resulting in performance degradation that may be prohibitive for real-time applications. Some stereo processing algorithms have computational complexity on the order of $n^5$, $O(n^5)$, to as high as $O(2^n)$, where n is the number of pixels used in the calculation. A trade off is generally made between speed on the one hand and resolution, edge preservation and depth estimation accuracy on the other, with speed being increased by limiting the number of pixels or simplifying the cost metric calculations or both.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides devices, systems and methods for stereoscopic depth reconstruction, for 3-D imaging, with improved probabilistic pixel correspondence searching. Depth information may be obtained from a pair of stereoscopic images, a left image and a right image, by determining the pixel offset (or disparity) of corresponding features in each image. The disparity computation compares pixels from the left image to pixels from the right image based on a cost metric that measures the difference between the two, with a minimum cost pixel selected for the estimated disparity. The left and right images may first be down-sampled to create smaller images at a lower resolution. The disparity computation may be performed between the low-resolution images, with increased efficiency due to the decreased number of pixels, even though a computationally intensive cost metric may be employed. A quality metric may also be calculated, with increased efficiency, to measure the confidence and quality of the low-resolution disparity computation. The low-resolution disparity matrix and the low-resolution quality matrix may then be up-sampled and a new disparity computation may be performed on the up-sampled disparity matrix, employing a more limited search region that is based on the up-sampled quality matrix.

In some embodiments, the image depth information that is estimated may be used to generate a 3-D image, for example as presented to a user viewing a 3-D display. The estimated image depth information may also be used to enable a 3-D vision system, such as, for example a robotic 3-D vision system with improved perceptual capabilities.

Figure 1:
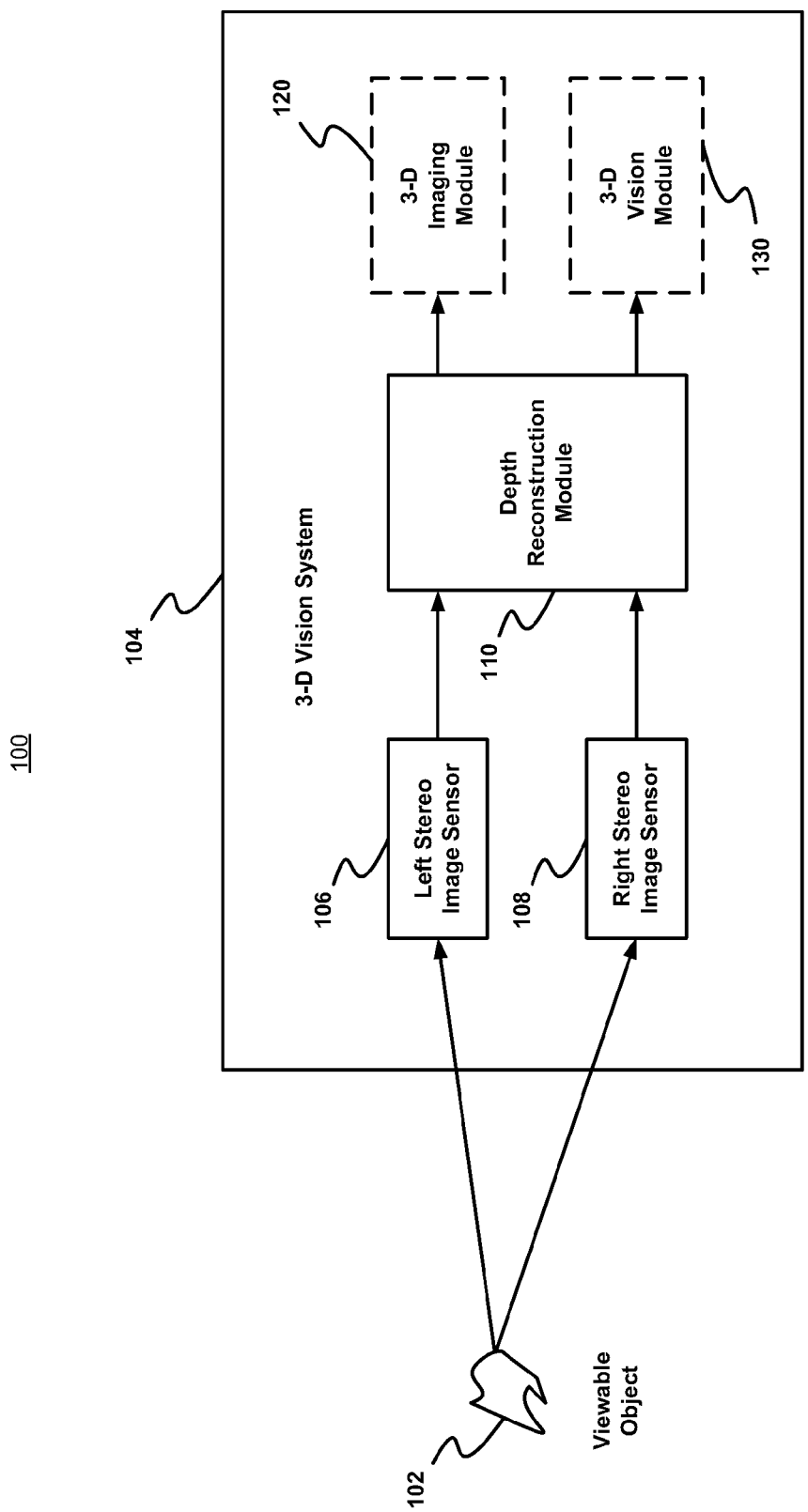
FIG. 1 illustrates a top level system diagram of one exemplary embodiment consistent with the present disclosure.

FIG. 1 illustrates a top level system diagram 100 of one exemplary embodiment consistent with the present disclosure. A three dimensional viewable object 102 may be viewed by a 3-D vision system 104. A left stereo image sensor 106 and a right stereo image sensor 108 may provide left and right channel images of the object 102. The left and right channel images may then be processed by depth reconstruction module 110 which performs pixel disparity computations with increased efficiency as will be described in greater detail below. In some embodiments, a 3-D imaging module 120 and/or a 3-D vision module 130 may generate or interpret 3-D images based on the estimated depth information provided by depth reconstruction module 110. In the discussion that follows, reference will be made to the search for pixel disparity of a pixel in the right image corresponding to an associated pixel in the left image. It will be appreciated, however, that these designations are made for convenience and that the left and right designations may be reversed in some embodiments. The computed pixel disparities are geometrically related to depth in the image at those locations associated with the pixels.

Figure 2:
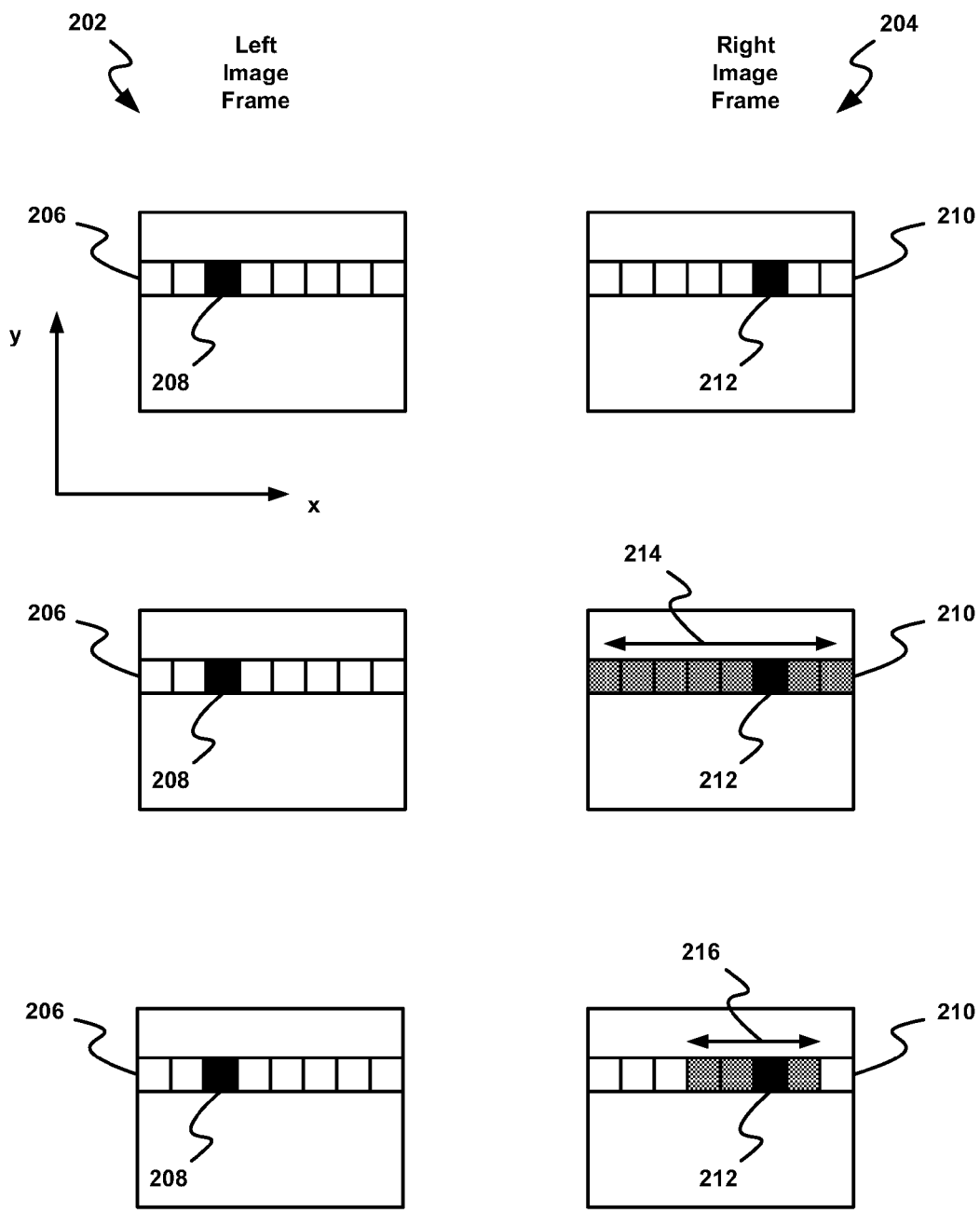
FIG. 2 illustrates pixel disparity searching consistent with an exemplary embodiment of the present disclosure.

FIG. 2 illustrates pixel disparity searching 200 consistent with an exemplary embodiment of the present disclosure. A simplified example of a left image frame 202 and a right image frame 204 are shown. A coordinate reference frame x-axis and y-axis are shown. Assuming the stereoscopic image sensors 106, 108 are aligned horizontally, as is typically the case, the pixel disparity search may be limited to a single row in the right image 204. For example, the search may be performed over the row 210 (in the right image 204) that corresponds to the row 206 containing the pixel 208 in the left image 202. The results of the search may yield the location offset (disparity) of the correspondence pixel 212 (in the right image 204) associated with pixel 208.

The search range 214 for correspondence pixel 212 in row 210 may be relatively large in the absence of additional information, typically ⅛ of the image width. The probabilistic correspondence search technique, to be discussed in greater detail below, may decrease the search range 216 resulting in a more efficient depth reconstruction.

Figure 3:
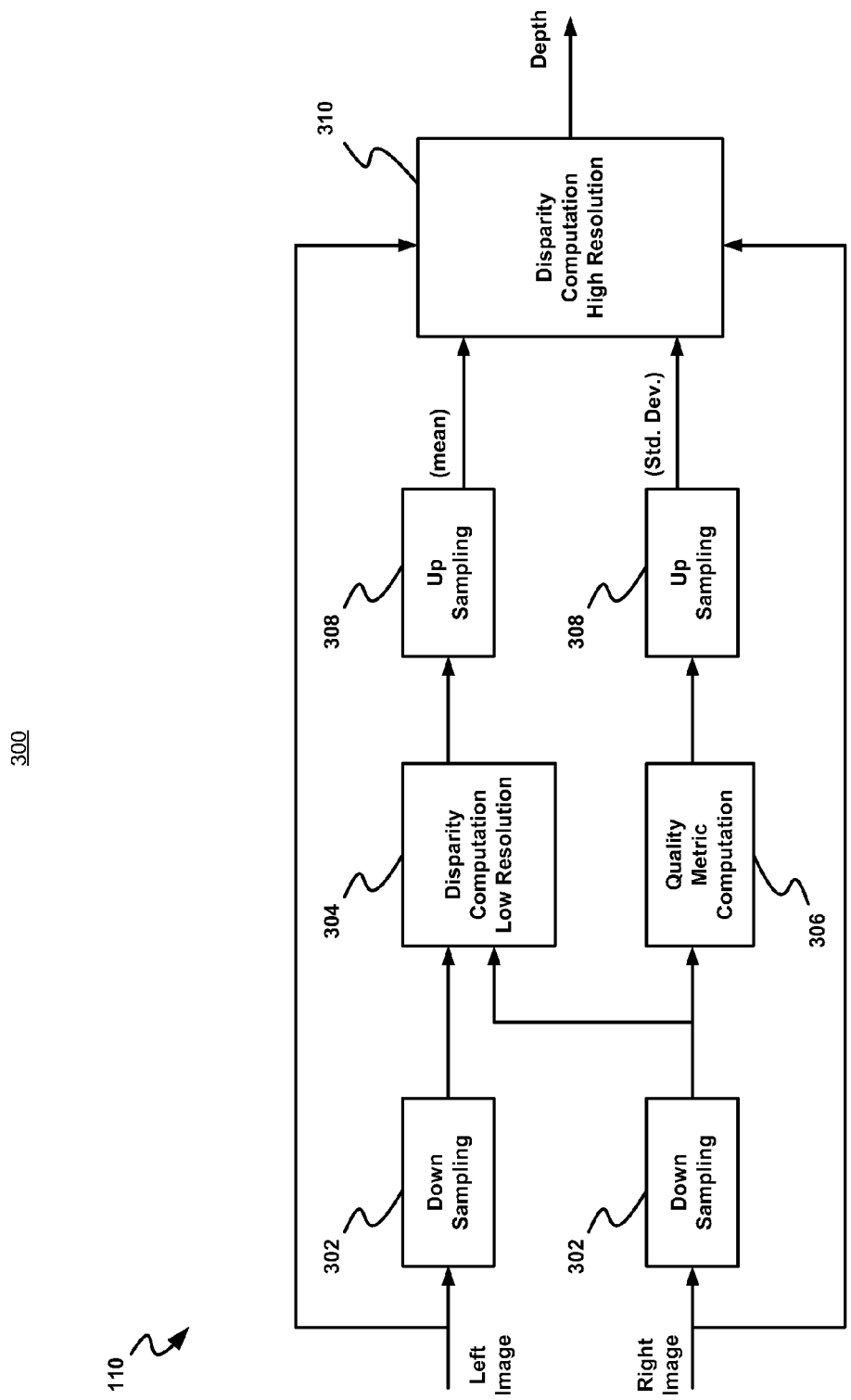
FIG. 3 illustrates a block diagram of one exemplary embodiment consistent with the present disclosure.

FIG. 3 illustrates a block diagram 300 of one exemplary embodiment consistent with the present disclosure. Shown is a more detailed view of depth reconstruction module 110, comprising down-sampling modules 302, low-resolution disparity computation module 304, quality metric computation module 306, up-sampling modules 308 and high-resolution disparity computation module 310. In operation, the left and right images may be down-sampled by down-sampling modules 302 to generate a reduced size and lower resolution version of the images. Down-sampling may be accomplished by averaging pixels within a region, sub-sampling pixels or any other suitable technique. In some embodiments the pixels may be down-sampled by a factor of 4.

The down-sampled images are provided to low-resolution disparity computation module 304, which generates a reduced resolution disparity matrix for the left down-sampled image comprising estimated correspondence pixels from the right down-sampled image. The disparity computation module compares regions of pixels from the left image to regions of pixels from the right image to find a best match based on a cost metric that measures the difference between the two, with a minimum cost selected for the estimated disparity. A computationally expensive cost metric (providing increased accuracy) may be used since the number of pixels has been reduced by the down-sampling modules 302.

The right down-sampled image is also provided to the quality metric computation module 306 generate a reduced resolution quality matrix comprising quality metric values associated with pixels in said right down-sampled image. The quality metrics may assign a confidence level, a heuristic or a probability the low resolution search matches. The calculation of quality metrics will be discussed in greater detail below, in connection with the description of FIG. 4, but the quality metrics may generally provide guidance on the selection of a search size or region to be used in a subsequent higher resolution disparity computation to identify correspondence pixels.

Up-sampling module 308 may generate a first (or preliminary) full resolution disparity matrix from the reduced resolution disparity matrix and also generate a full resolution quality matrix from the reduced resolution quality matrix. The up-sampling may be accomplished by interpolation or any other suitable technique. In some embodiments the up-sampled full resolution may match the original resolution of the left and right images provided by sensors 106, 108.

High-resolution disparity computation module 310 may generate a second (or final) full resolution disparity matrix for the left image comprising estimated correspondence pixels from the right image. The estimated correspondence pixels may be selected from a search range in the right image that is based on the first full resolution disparity matrix and the full resolution quality matrix. The search range may be reduced, and computational efficiency increased, based on information from the first full resolution disparity matrix and the full resolution quality matrix. For example the disparity, d, for a pixel at location x,y may be computed as:

$$d=\operatorname{argmin}\{\operatorname{costFunction}(\operatorname{leftimage}(x,y),\operatorname{rightimage}(x+d,y))\},$$

for $d=[minX, maxX]$ where the search range from minx to maxX is based on the first disparity estimate and the associated quality metric. A computationally less expensive cost metric may be used in the high-resolution disparity computation, providing increased speed and efficiency, while still maintaining an increased level of accuracy associated with the cost metric used on the low-resolution disparity computation.

Figure 4:
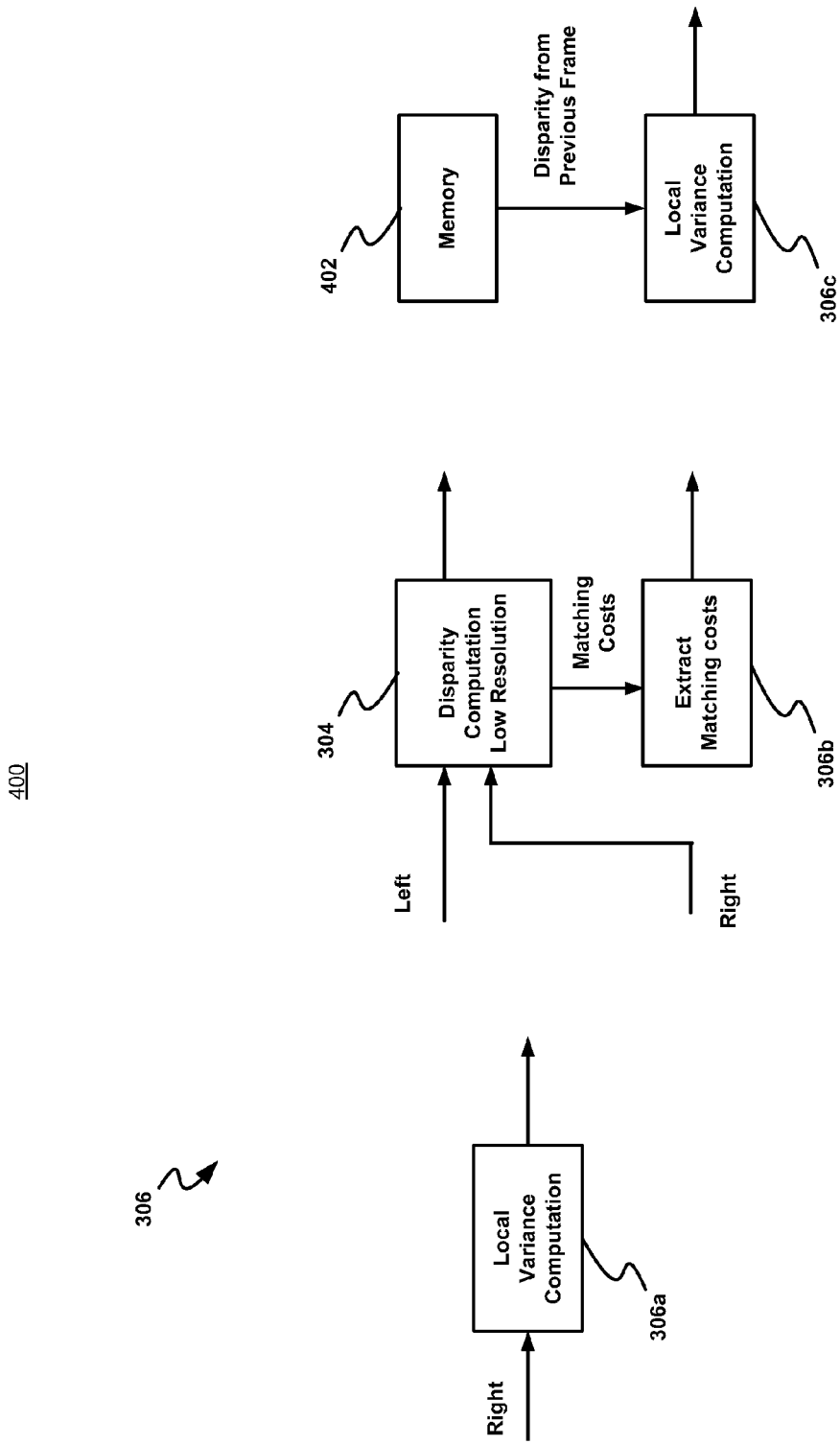
FIG. 4 illustrates additional block diagram details of an exemplary embodiment consistent with the present disclosure.

FIG. 4 illustrates additional block diagram details 400 of an exemplary embodiment consistent with the present disclosure. Three examples of quality metric computation module 306 are shown, although other variations are possible. In the first example 306a, the quality metric is a local region variance (or standard deviation, σ) calculation. The variance of pixel values in a region of the right image may provide an indication of noise, texture and edge qualities in that region of the image which may impact the disparity computation and size of the high-resolution search region. In this case, the full-resolution search range may center on the pixel from the first full resolution disparity matrix and extend out in either direction by k*σ, where k is a pre-determined or adjustable scale factor and σ is the standard deviation quality metric.

In the second example 306b, the matching costs generated by the low-resolution disparity computation module 304 are extracted or identified and used as the quality metric. These matching costs may provide an indication of how well the low-resolution disparity computation was able to find and match correspondence pixels which may also impact the size of the high-resolution search region. In the third example 306c, a local variance computation may be performed on the disparity values from a previous image frame which have been stored in memory 402.

Figure 5:
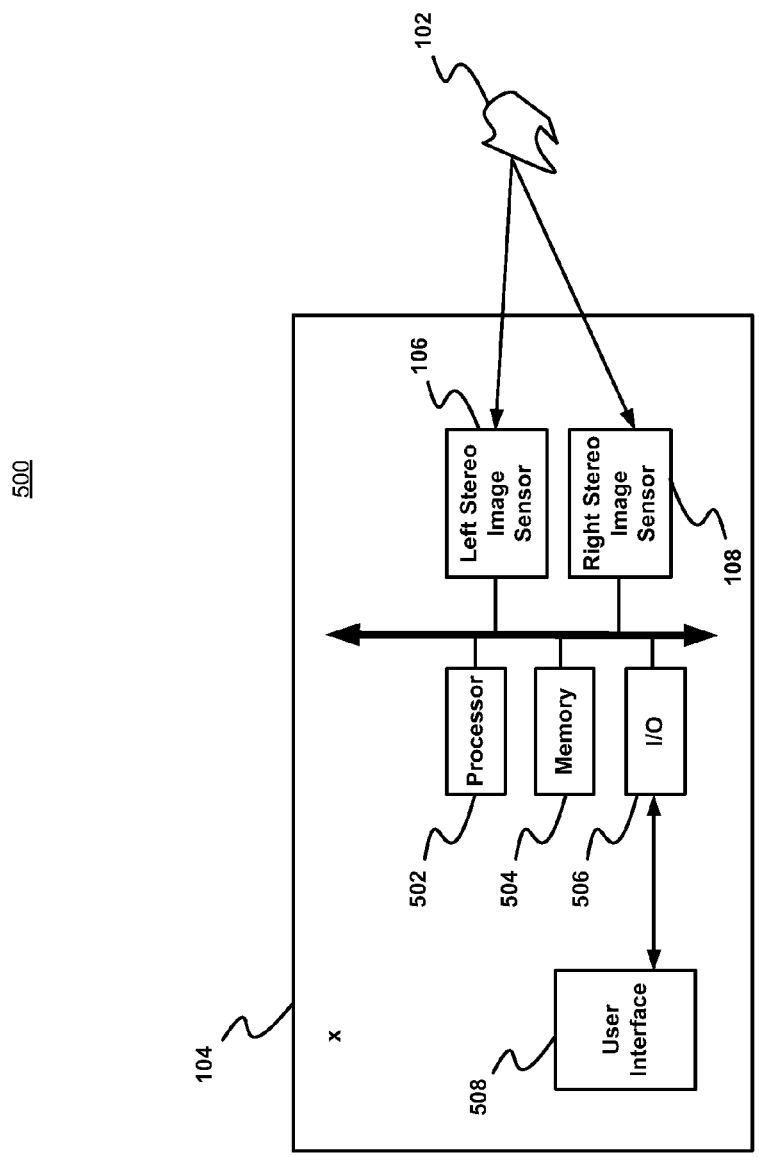
FIG. 5 illustrates a system diagram consistent with an exemplary embodiment of the present disclosure.

FIG. 5 illustrates a system diagram 500 consistent with an exemplary embodiment of the present disclosure. A 3-D vision system 104 may be configured to view an object 102 with left and right stereoscopic image sensors 106 and 108. Image depth reconstruction functions may be implemented by a processor 502 and memory 504 that operate on images provided by sensors 106, 108. Depth reconstruction functions may include up-sampling, down-sampling, low-resolution and high-resolution disparity computation and quality metric calculations, as described above. In some embodiments, the 3-D vision system 104 may further include an input output module 506 and/or a user interface 508 for displaying images and providing user control capabilities.

Figure 6:
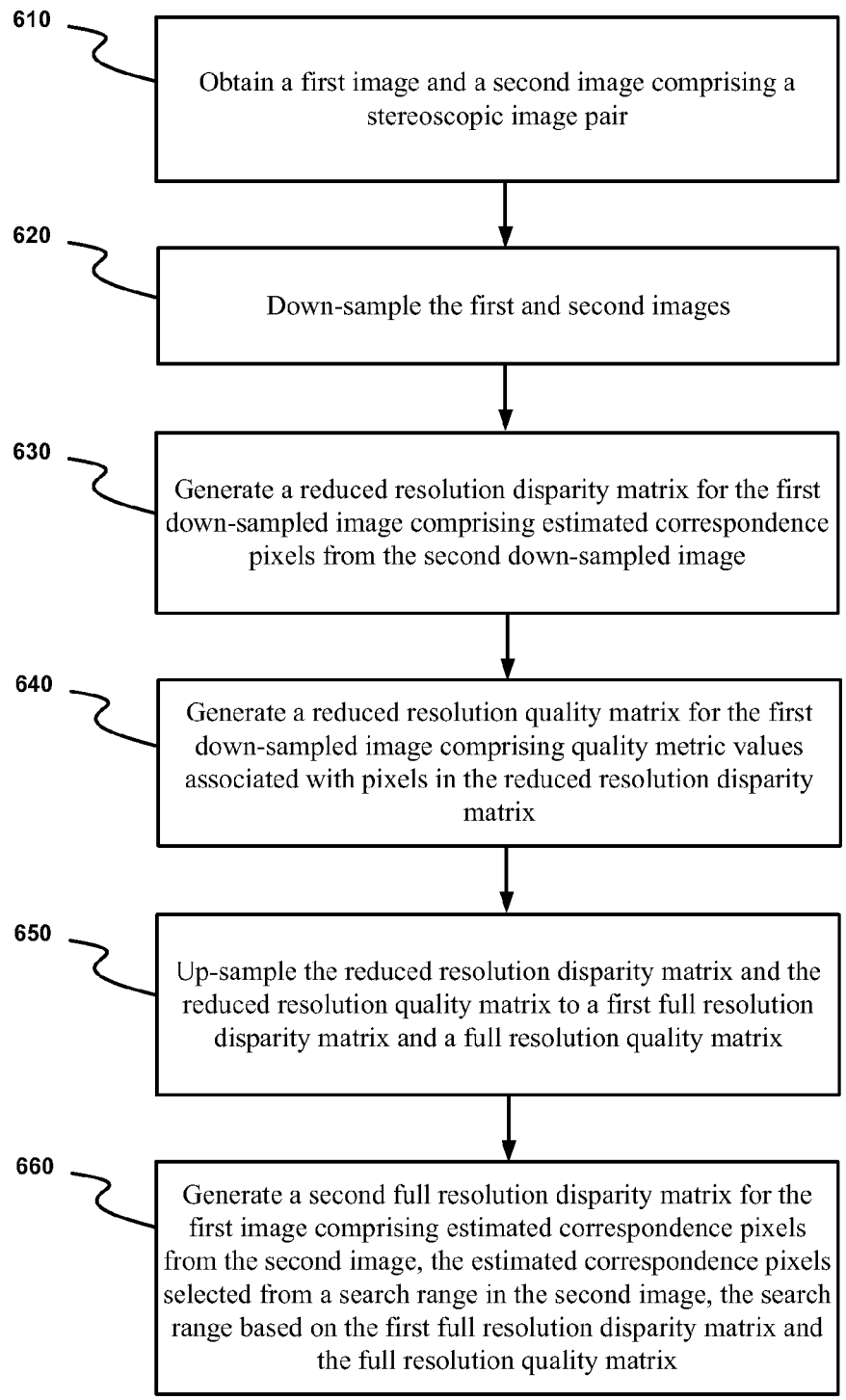
FIG. 6 illustrates a flowchart of operations of an exemplary embodiment consistent with the present disclosure.

FIG. 6 illustrates a flowchart of operations 600 of an exemplary embodiment consistent with the present disclosure. At operation 610, a first image and a second image comprising a stereoscopic image pair are obtained. At operation 620, the first and second images are down-sampled. At operation 630, a reduced resolution disparity matrix for the first down-sampled image is generated. The reduced resolution disparity matrix includes estimated correspondence pixels from the second down-sampled image. At operation 640, a reduced resolution quality matrix for the first down-sampled image is generated. The reduced resolution quality matrix includes quality metric values associated with pixels in the reduced resolution disparity matrix. At operation 650, the reduced resolution disparity matrix and the reduced resolution quality matrix are up-sampled to a first full resolution disparity matrix and a full resolution quality matrix. At operation 660, a second full resolution disparity matrix is generated for the first image including estimated correspondence pixels from the second image. The estimated correspondence pixels are selected from a search range in the second image. The search range is based on the first full resolution disparity matrix and the full resolution quality matrix.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides a method, device, and system for stereoscopic depth reconstruction, for 3-D imaging, with improved probabilistic pixel correspondence searching. Quality metrics may be calculated on regions of pixels to provide confidence levels, probabilities and/or heuristics that guide and improve the disparity search.

The method may include obtaining a first image and a second image comprising a stereoscopic image pair. The method of this example may also include down-sampling the first image and down-sampling the second image. The method of this example may further include generating a reduced resolution disparity matrix for the first down-sampled image including estimated correspondence pixels from the second down-sampled image. The method of this example may further include generating a reduced resolution quality matrix including quality metric values associated with pixels in the reduced resolution disparity matrix. The method of this example may further include up-sampling the reduced resolution disparity matrix to a first full resolution disparity matrix. The method of this example may further include up-sampling the reduced resolution quality matrix to a full resolution quality matrix. The method of this example may further include generating a second full resolution disparity matrix for the first image including estimated correspondence pixels from the second image, the estimated correspondence pixels selected from a search range in the second image, the search range based on the first full resolution disparity matrix and the full resolution quality matrix.

Another example method includes the forgoing operations and further includes generating a 3-D image based on depth information estimated from the second full resolution disparity matrix.

Another example method includes the forgoing operations and the disparities are computed by selecting a correspondence pixel from a search range of correspondence pixels, the selected correspondence pixel minimizing a cost function relative to other pixels in the search range.

Another example method includes the forgoing operations and the search range for the second full resolution disparity matrix is restricted to pixels within a search distance proportional to an associated quality metric from the full resolution quality matrix.

Another example method includes the forgoing operations and the quality metric values associated with pixels in the second down-sampled image are based on a calculated standard deviation of a plurality of pixels in a region of the second down-sampled image.

Another example method includes the forgoing operations and the down-sampling is based on averaging.

Another example method includes the forgoing operations and the up-sampling is based on interpolation.

Another example method includes the forgoing operations and the first image is a left channel of a stereoscopic image and the second image is a right channel of a stereoscopic image.

Another example method includes the forgoing operations and the first image is a right channel of a stereoscopic image and the second image is a left channel of a stereoscopic image.

According to another aspect there is provided a device. The device may include a down-sampling module configured to down-sample a first and second image, and the first and second images include a stereoscopic image pair. The device of this example may also include a low-resolution disparity computation module coupled to the down-sampling module, the low-resolution disparity computation module configured to generate a reduced resolution disparity matrix for the first down-sampled image including estimated correspondence pixels from the second down-sampled image. The device of this example may further include a quality metric computation module coupled to the down-sampling module, the quality metric computation module configured to generate a reduced resolution quality matrix including quality metric values associated with pixels in the reduced resolution disparity matrix. The device of this example may also include an up-sampling module coupled to the low-resolution disparity computation module and the quality metric computation module, the up-sampling module configured to generate a first full resolution disparity matrix from the reduced resolution disparity matrix and further configured to generate a full resolution quality matrix from the reduced resolution quality matrix. The device of this example may also include a high-resolution disparity computation module coupled to the up-sampling module, the high-resolution disparity computation module configured to generate a second full resolution disparity matrix for the first image including estimated correspondence pixels from the second image, the estimated correspondence pixels selected from a search range in the second image, the search range based on the first full resolution disparity matrix and the full resolution quality matrix.

Another example device includes the forgoing components and further includes a 3-D imaging module configured to generate a 3-D image based on depth information estimated from the second full resolution disparity matrix.

Another example device includes the forgoing components and further includes a cost function calculation module, and the disparities are computed by selecting a correspondence pixel from a search range of correspondence pixels, the selected correspondence pixel minimizing a cost function relative to other pixels in the search range, the cost function generated by the cost function calculation module.

Another example device includes the forgoing components and the search range for the second full resolution disparity matrix is restricted to pixels within a search distance proportional to an associated quality metric from the full resolution quality matrix.

Another example device includes the forgoing components and the quality metric values associated with pixels in the second down-sampled image are based on a calculated standard deviation of a plurality of pixels in a region of the second down-sampled image.

Another example device includes the forgoing components and the down-sampling module averages pixels.

Another example device includes the forgoing components and the up-sampling module interpolates pixels.

Another example device includes the forgoing components and further includes a left channel stereoscopic imaging sensor and a right channel stereoscopic imaging sensor.

Another example device includes the forgoing components and the first image is obtained from the left channel stereoscopic imaging sensor and the second image is obtained from the right channel stereoscopic imaging sensor.

Another example device includes the forgoing components and the first image is obtained from the right channel stereoscopic imaging sensor and the second image is obtained from the left channel stereoscopic imaging sensor.

According to another aspect there is provided at least one computer-readable storage medium having instructions stored thereon which when executed by a processor, cause the processor to perform the steps of the method as described in the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method for stereoscopic pixel correspondence estimation, said method comprising:
    obtaining a first image and a second image, wherein said first image and said second image comprise a stereoscopic image pair;
    down-sampling said first image;
    down-sampling said second image;
    generating a reduced resolution disparity matrix for said first down-sampled image comprising estimated correspondence pixels from said second down-sampled image;
    generating a reduced resolution quality matrix comprising quality metric values associated with pixels in said reduced resolution disparity matrix;
    up-sampling said reduced resolution disparity matrix to a first full resolution disparity matrix;
    up-sampling said reduced resolution quality matrix to a full resolution quality matrix; and
    generating a second full resolution disparity matrix for said first image comprising estimated correspondence pixels from said second image, said estimated correspondence pixels selected from a search range in said second image, said search range based on said first full resolution disparity matrix and said full resolution quality matrix.

2. The method of claim 1, further comprising generating a three dimensional (3-D) image based on depth information estimated from said second full resolution disparity matrix.

3. The method of claim 1, wherein said disparities are computed by selecting a correspondence pixel from a search range of correspondence pixels, said selected correspondence pixel minimizing a cost function relative to other pixels in said search range.

4. The method of claim 3, wherein said search range for said second full resolution disparity matrix is restricted to pixels within a search distance proportional to an associated quality metric from said full resolution quality matrix.

5. The method of claim 1, wherein said quality metric values associated with pixels in said second down-sampled image are based on a calculated standard deviation of a plurality of pixels in a region of said second down-sampled image.

6. The method of claim 1, wherein said down-sampling is based on averaging.

7. The method of claim 1, wherein said up-sampling is based on interpolation.

8. The method of claim 1, wherein said first image is a left channel of a stereoscopic image and said second image is a right channel of a stereoscopic image.

9. The method of claim 1, wherein said first image is a right channel of a stereoscopic image and said second image is a left channel of a stereoscopic image.

10. A stereoscopic pixel correspondence estimation device comprising:
    a down-sampling module configured to down-sample a first and second image, wherein said first and second images comprise a stereoscopic image pair;
    a low-resolution disparity computation module coupled to said down-sampling module, said low-resolution disparity computation module configured to generate a reduced resolution disparity matrix for said first down-sampled image comprising estimated correspondence pixels from said second down-sampled image;
    a quality metric computation module coupled to said down-sampling module, said quality metric computation module configured to generate a reduced resolution quality matrix comprising quality metric values associated with pixels in said reduced resolution disparity matrix;
    an up-sampling module coupled to said low-resolution disparity computation module and said quality metric computation module, said up-sampling module configured to generate a first full resolution disparity matrix from said reduced resolution disparity matrix and further configured to generate a full resolution quality matrix from said reduced resolution quality matrix; and
    a high-resolution disparity computation module coupled to said up-sampling module, said high-resolution disparity computation module configured to generate a second full resolution disparity matrix for said first image comprising estimated correspondence pixels from said second image, said estimated correspondence pixels selected from a search range in said second image, said search range based on said first full resolution disparity matrix and said full resolution quality matrix.

11. The device of claim 10, further comprising a three dimensional (3-D) imaging module configured to generate a 3-D image based on depth information estimated from said second full resolution disparity matrix.

12. The device of claim 10, further comprising a cost function calculation module, wherein said disparities are computed by selecting a correspondence pixel from a search range of correspondence pixels, said selected correspondence pixel minimizing a cost function relative to other pixels in said search range, said cost function generated by said cost function calculation module.

13. The device of claim 12, wherein said search range for said second full resolution disparity matrix is restricted to pixels within a search distance proportional to an associated quality metric from said full resolution quality matrix.

14. The device of claim 10, wherein said quality metric values associated with pixels in said second down-sampled image are based on a calculated standard deviation of a plurality of pixels in a region of said second down-sampled image.

15. The device of claim 10, wherein said down-sampling module averages pixels.

16. The device of claim 10, wherein said up-sampling module interpolates pixels.

17. The device of claim 10, further comprising a left channel stereoscopic imaging sensor and a right channel stereoscopic imaging sensor.

18. The device of claim 17, wherein said first image is obtained from said left channel stereoscopic imaging sensor and said second image is obtained from said right channel stereoscopic imaging sensor.

19. The device of claim 17, wherein said first image is obtained from said right channel stereoscopic imaging sensor and said second image is obtained from said left channel stereoscopic imaging sensor.

20. A non-transitory computer-readable storage medium having instructions stored thereon which when executed by a processor result in the following operations for stereoscopic pixel correspondence estimation, said operations comprising:
   obtaining a first image and a second image, wherein said first image and said second image comprise a stereoscopic image pair;
   down-sampling said first image;
   down-sampling said second image;
   generating a reduced resolution disparity matrix for said first down-sampled image comprising estimated correspondence pixels from said second down-sampled image;
   generating a reduced resolution quality matrix comprising quality metric values associated with pixels in said reduced resolution disparity matrix;
   up-sampling said reduced resolution disparity matrix to a first full resolution disparity matrix;
   up-sampling said reduced resolution quality matrix to a full resolution quality matrix; and
   generating a second full resolution disparity matrix for said first image comprising estimated correspondence pixels from said second image, said estimated correspondence pixels selected from a search range in said second image, said search range based on said first full resolution disparity matrix and said full resolution quality matrix.

21. The non-transitory computer-readable storage medium of claim 20, further comprising the operations of generating a three dimensional (3-D) image based on depth information estimated from said second full resolution disparity matrix.

22. The non-transitory computer-readable storage medium of claim 20, wherein said disparities are computed by selecting a correspondence pixel from a search range of correspondence pixels, said selected correspondence pixel minimizing a cost function relative to other pixels in said search range.

23. The non-transitory computer-readable storage medium of claim 22, wherein said search range for said second full resolution disparity matrix is restricted to pixels within a search distance proportional to an associated quality metric from said full resolution quality matrix.

24. The non-transitory computer-readable storage medium of claim 20, wherein said quality metric values associated with pixels in said second down-sampled image are based on a calculated standard deviation of a plurality of pixels in a region of said second down-sampled image.

25. The non-transitory computer-readable storage medium of claim 20, wherein said down-sampling is based on averaging.

26. The non-transitory computer-readable storage medium of claim 20, wherein said up-sampling is based on interpolation.

27. The non-transitory computer-readable storage medium of claim 20, wherein said first image is a left channel of a stereoscopic image and said second image is a right channel of a stereoscopic image.

28. The non-transitory computer-readable storage medium of claim 20, wherein said first image is a right channel of a stereoscopic image and said second image is a left channel of a stereoscopic image.

* * * * *